United States Patent
Pavlovic et al.

(10) Patent No.: US 6,655,265 B2
(45) Date of Patent: Dec. 2, 2003

(54) KITCHEN APPLIANCE

(75) Inventors: Henrik Pavlovic, Ljubno Ob Savinji (SI); Igor Zibret, Smartno Ob Paki (SI)

(73) Assignee: BSH Bosch und Siemens Hausgerate GmbH, Munich (DE)

( * ) Notice: Subject to any disclaimer, the term of this patent is extended or adjusted under 35 U.S.C. 154(b) by 0 days.

(21) Appl. No.: 10/261,125

(22) Filed: Sep. 30, 2002

(65) Prior Publication Data

US 2003/0075627 A1 Apr. 24, 2003

Related U.S. Application Data

(63) Continuation of application No. PCT/EP01/02084, filed on Feb. 23, 2001.

(30) Foreign Application Priority Data

Mar. 31, 2000 (DE) .......................................... 100 16 293

(51) Int. Cl.[7] .............................. A23L 1/00; A23N 1/00; A47J 43/046; A47J 43/07; B02C 18/16
(52) U.S. Cl. .............................. 99/492; 99/337; 99/348; 241/37.5; 241/92; 366/314; 366/601
(58) Field of Search .......................... 99/331, 337, 338, 99/326–330, 486, 492, 348, 501–513; 241/37.5, 92, 36, 282.1, 282.2, 280; 83/356.3, 355, 932; 200/302.1–302.3; 361/195–203; 219/492, 494, 442, 506, 486, 714; 340/870.17; 318/811, 772; 700/90; 366/314, 601

(56) References Cited

U.S. PATENT DOCUMENTS

| | | | |
|---|---|---|---|
| 4,362,277 A | | 12/1982 | Amiot |
| 4,371,118 A | * | 2/1983 | Sontheimer et al. ... 241/37.5 X |
| 4,542,857 A | * | 9/1985 | Akasaka .................... 99/492 X |
| 4,572,445 A | * | 2/1986 | Cristante ................. 366/601 X |
| 4,629,131 A | * | 12/1986 | Podell ........................ 241/92 X |
| 4,691,870 A | * | 9/1987 | Fukunaga et al. ......... 99/492 X |
| 4,741,482 A | * | 5/1988 | Coggiola et al. ..... 241/282.1 X |
| 4,799,626 A | * | 1/1989 | Hickel et al. .............. 99/492 X |
| 4,921,174 A | * | 5/1990 | Okada et al. ............... 241/37.5 |
| 4,921,175 A | * | 5/1990 | Okada et al. ........... 366/314 X |
| 5,244,275 A | * | 9/1993 | Bauer et al. .............. 99/510 X |
| 5,347,205 A | * | 9/1994 | Piland ..................... 366/601 X |
| 5,435,237 A | * | 7/1995 | Huang .......................... 99/492 |
| 5,454,299 A | * | 10/1995 | Gonneaud .................... 99/492 |

FOREIGN PATENT DOCUMENTS

| | | |
|---|---|---|
| EP | 0 081 874 | 6/1983 |
| FR | 2 545 712 | 11/1984 |
| GB | 2 249 368 A | 5/1992 |

* cited by examiner

Primary Examiner—Timothy F. Simone
(74) Attorney, Agent, or Firm—Laurence A. Greenberg; Werner H. Stemer; Ralph E. Locher

(57) ABSTRACT

A kitchen appliance, in particular, a food processor or juice extractor, includes an attachment coupled to an electromotive drive of the appliance disposed in a container that can be closed by a lid part, and an actuating element for a switch located in the circuit of the electromotive drive provided on a housing of the kitchen appliance. Contact with rotating processing attachments is prevented by providing a locking block that can be adjusted by the switching movement of the actuating element and into the adjusting path of which there projects a locking member that can be automatically adjusted into its locking position by the action of a force and can be moved out of its locking position by an adjusting mechanism coupled to the lid part.

19 Claims, 2 Drawing Sheets

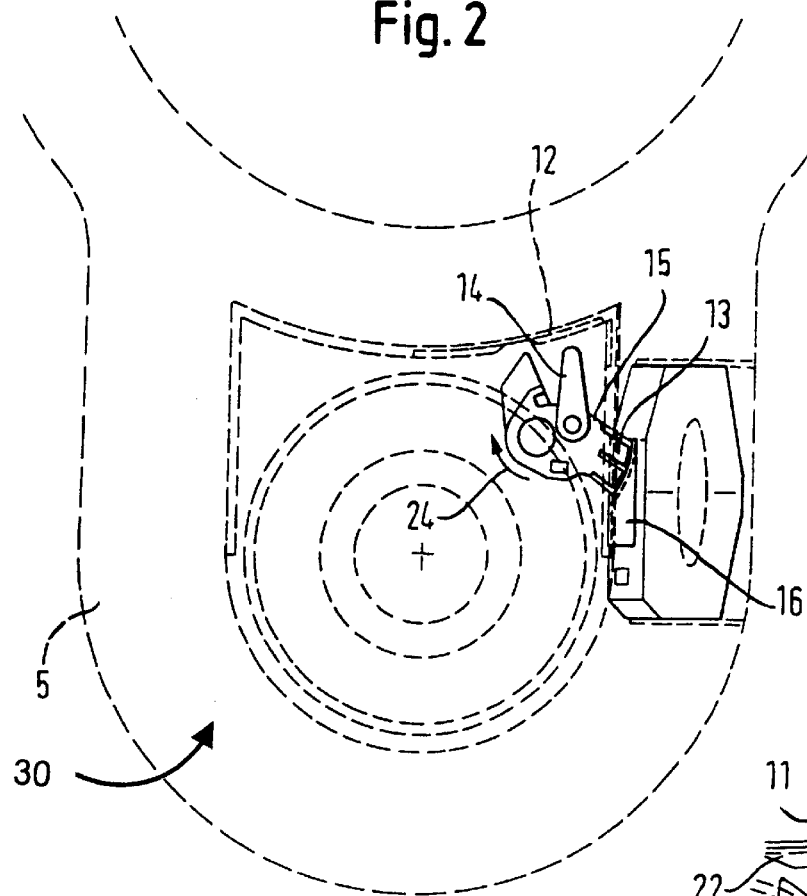
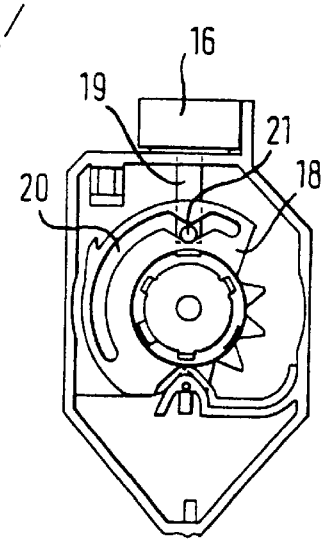
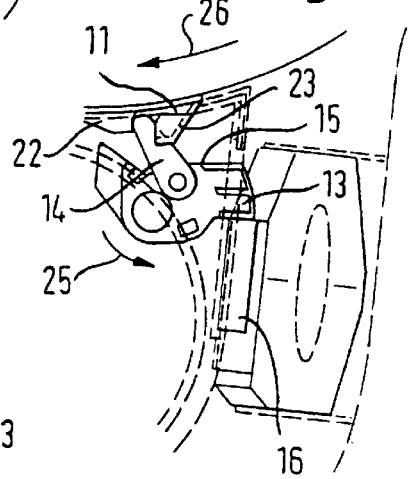
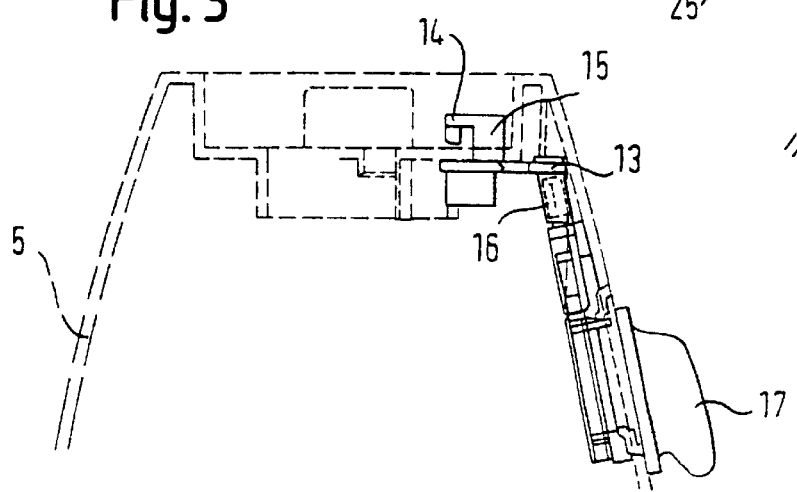

KITCHEN APPLIANCE

CROSS-REFERENCE TO RELATED APPLICATION

This application is a continuation of copending International Application No. PCT/EP01/02084, filed Feb. 23, 2001, which designated the United States and was not published in English.

BACKGROUND OF THE INVENTION

Field of the Invention

The invention relates to a kitchen appliance, in particular, a food processor or juice extractor, in which an attachment that is coupled to the electromotive drive of the appliance is disposed in a container that can be closed by a lid part, and an actuating element for a switch located in the circuit of the electromotive drive is provided on the housing of the kitchen appliance.

A prior art kitchen appliance has a mixing bowl that can be closed by a lid. In the mixing bowl, various processing attachments, e.g., dough hooks or whisks, can be plugged onto an output shaft that is disposed in the center of the mixing bowl and is driven by the drive motor of the food processor. If the lid has not been placed in position on the mixing bowl, there is a risk of injury being caused by the rotating processing attachments.

SUMMARY OF THE INVENTION

It is accordingly an object of the invention to provide a kitchen appliance that overcomes the hereinafore-mentioned disadvantages of the heretofore-known devices of this general type and that, as far as possible, eliminates any risk of injury caused by the rotating processing attachments.

With the foregoing and other objects in view, there is provided, in accordance with the invention, a kitchen appliance, including an electromotive drive having a circuit with a switch, a container having a lid for closing the container, the lid having an adjusting mechanism, an attachment selectively coupled to the drive when disposed in the container, a housing for receiving the container, a switchable actuating element disposed on the housing, the actuating element connected to the switch, a locking block connected to and adjusted by a switching movement of the actuating element, a locking block having an adjusting path, the locking block and the actuating element being two separate components mechanically coupled to one another to adjust the locking block by a switching movement of the actuating element, and a locking member selectively moving into and out of the adjusting path, the locking member having a locking position and a bias device imparting a locking force automatically adjusting the locking member into the locking position, the adjusting mechanism selectively moving the locking member out of the locking position. The kitchen appliance can be a food processor or a juice extractor.

According to the invention, there is provided a locking block that can be adjusted by the switching movement of the actuating element and into the adjusting path of which there projects a locking member that can be automatically adjusted into its locking position by the action of a force and can be moved out of its locking position by an adjusting mechanism coupled to the lid part. The locking member, which projects into the adjusting path of the locking block, prevents a switching movement of the actuating element. It is only when the locking member has been pivoted out of its locking position by the lid part that a switching movement of the actuating element is possible. This means that the kitchen appliance can only be switched on when the lid part has been placed in position on the container. Contact with the rotating processing attachments is, thus, no longer possible.

In accordance with another feature of the invention, the housing has a vertically running housing part with a slot, the adjusting mechanism on the lid is a radially outwardly projecting lug pivoted by a corresponding rotary movement of the container into the slot, the lug having a pivoting path, and the locking member is a pivoting locking member having first and second lever arms, the first lever arm disposed in the adjusting path of the locking block, and the second lever arm projecting, in a region of the slot, into the pivoting path of the lug.

In accordance with yet a further feature of the invention, the appliance is a food processor, the container is a mixing bowl, the lid is removably attached to the mixing bowl, the housing has a vertically running housing part with a slot, the adjusting mechanism on the lid is a radially outwardly projecting lug pivoted by a corresponding rotary movement of the mixing bowl into the slot, the lug having a pivoting path, and the locking member is a pivoting locking member having first and second lever arms, the first lever arm disposed in the adjusting path of the locking block, and the second lever arm projecting, in a region of the slot, into the pivoting path of the lug.

In the case of a kitchen appliance configured as a food processor, the corresponding locking of the switching movement of the actuating element can be straightforwardly achieved in construction terms in that, a radially outwardly projecting lug is formed as adjusting mechanism on the lid part, which can be placed in position on the mixing bowl of the food processor, the radially outwardly projecting lug being pivotable, by a corresponding rotary movement of the mixing bowl, into a slot provided on a vertically running housing part of the food processor. The locking member has double-lever-armed configuration and is disposed in a pivotable manner, and the first lever arm of the locking member is located in the adjusting path of the locking block. Furthermore, the second lever arm of the locking member projects, in the region of the slot, into the pivoting path of the lug.

In accordance with a further feature of the invention, the bias device is a spring and the locking force is a spring force.

The locking member is expediently pivoted back into its locking position by the action of the spring force. Such a configuration ensures that the locking member always assumes its locking position as soon as it is no longer retained in the release position by the lid of the mixing bowl.

In accordance with an added feature of the invention, the adjustment of the locking block in dependence on the respective switching movement of the actuating element is straightforwardly achieved by having the locking block butt, by the action of force, against a guide track provided on a guide plate, which is coupled, in the direction of rotation, to the actuating element configured as a rotatable switching toggle. Such an embodiment provides force-fitting coupling of the locking block to the guide plate.

In accordance with an additional feature of the invention, form-fitting coupling of the locking block to the guide plate is provided by the locking block engaging, through a pin connected thereto, in a guide slot provided on a guide plate, which is coupled, in the direction of rotation, to the actuating element configured as a rotatable switching toggle.

In accordance with yet another feature of the invention, the switching toggle has an on position, the locking member is a pivoting locking member pivoting in a pivot direction, and in the on position of the switching toggle, the locking block engages upstream of the first lever arm in the pivot direction and blocks a pivoting movement of the locking member in a direction opposite the pivot direction.

The lid is prevented from being removed from the mixing bowl in the "on" position of the actuating element in that, in the on position of the switching toggle, the locking block engages behind the first lever arm of the locking member and blocks the pivoting-back movement of the locking member. As long as the switching toggle, and, thus, also the switch that can be actuated thereby, is located in the "on" position, the locking member cannot be pivoted back. This also blocks the lid from being pivoted, which latter movement could move the lug out of the slot. As long as the lug is located in the slot, however, the lid cannot be removed from the mixing bowl.

With the objects of the invention in view, there is also provided a kitchen appliance, including a drive having a control switch, a container for receiving a removable attachment connected to the drive when disposed in the container, the container having a lid for closing the container, the lid having an adjusting mechanism, a housing for receiving the container, a switchable actuating element disposed on the housing, the actuating element connected to the control switch, a locking block having an adjusting path, the locking block connected to and adjusted by a switching movement of the actuating element, the locking block and the actuating element being two separate components, and a locking member selectively moving into and out of the adjusting path, the locking member having a locking position and a bias device imparting a locking force automatically adjusting the locking member into the locking position, the adjusting mechanism selectively moving the locking member out of the locking position when the lid is placed to close the container.

With the objects of the invention in view, in a kitchen appliance having a drive with a control switch, a container for receiving a removable attachment connected to the drive when disposed in the container, and a housing for receiving the container, there is also provided a control device including a lid for closing the container, the lid having an adjusting mechanism, a switchable actuating element disposed on the housing, the actuating element connected to the control switch of the drive, a locking block having an adjusting path, the locking block connected to and adjusted by a switching movement of the actuating element, the locking block and the actuating element being two separate components, and a locking member selectively moving into and out of the adjusting path, the locking member having a locking position and a bias device imparting a locking force automatically adjusting the locking member into the locking position, the adjusting mechanism selectively moving the locking member out of the locking position when the lid is placed to close the container.

Other features that are considered as characteristic for the invention are set forth in the appended claims.

Although the invention is illustrated and described herein as embodied in a kitchen appliance, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

BRIEF DESCRIPTION OF THE DRAWINGS

FIG. 2 is a fragmentary, partially hidden, plan view of a locking member configuration according to the invention that can be adjusted by a mixing bowl lid;

FIG. 3 is a fragmentary, partially hidden, cross-sectional view of the locking member configuration of FIG. 2;

FIG. 4 is an elevational side view of a coupling of a locking block of FIGS. 2 and 3 to a guide plate connected in a rotationally fixed manner to a switching toggle; and FIG. 5 is a fragmentary, partially hidden, plan view of the locking member configuration of FIGS. 2 and 3 showing the locking member in an "on" position of a switching toggle connected to a switch of a drive motor.

DESCRIPTION OF THE PREFERRED EMBODIMENTS

Figure 1:
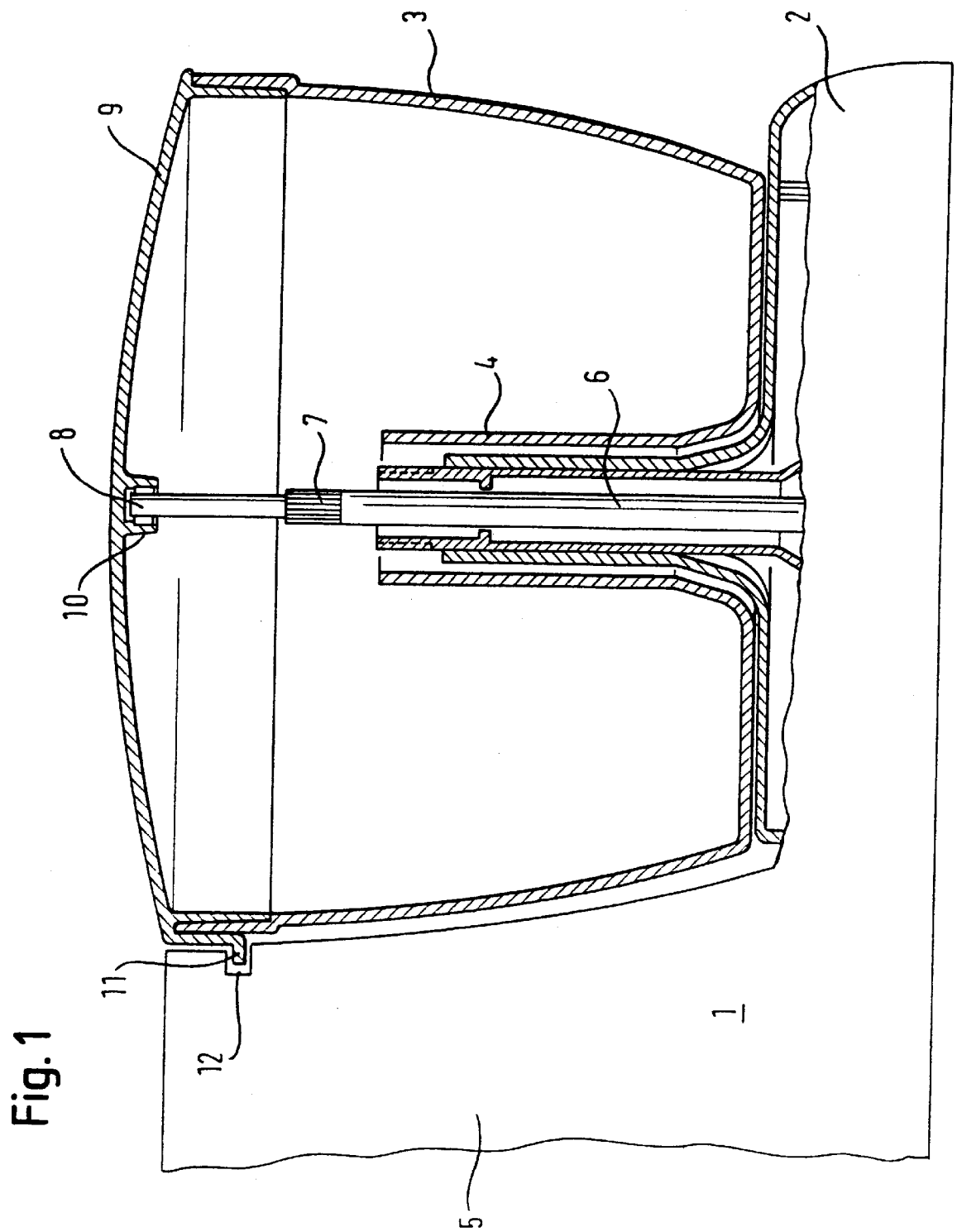
FIG. 1 is a fragmentary, sectional view of a food processor according to the invention with a mixing bowl placed in position on a base part of the food processor.

Referring now to the figures of the drawings in detail and first, particularly to FIG. 1 thereof, there is shown a housing 1 of a food processor. A mixing bowl 3 has been placed in position on the horizontal base part 2 of the housing 1. The mixing bowl 3 has a central hollow connection stub 4 through which an output shaft 6, which is driven by a drive motor 30 installed in the vertically running housing part 5 of the housing 1 (see FIG. 2), is guided. The output shaft 6 has a coupling point 7 for processing attachments. The output shaft 6 is mounted by its free end 8 in a bearing mount 10 provided on the lid 9 of the mixing bowl 3. A radially outwardly oriented lug 11 is integrally formed on the lid 9 and can be pivoted, by a pivoting movement of the lid 9, into a horizontal slot 12 provided on the vertical housing part 5.

A locking member 15 having first and second lever arms 13, 14 is disposed in a pivotable manner in the interior of the housing part 5, in a region of the slot 12. A spring that is not illustrated in the drawing forces the locking member 15 into its locking position (see arrow 24 in FIG. 2), in which the first lever arm 13 is located vertically above a locking block 16. The locking block 16 is displaced in a vertical direction during switching movements of a switching toggle 17, which actuates a non-illustrated switch located in the circuit of the drive motor (see FIG. 3). Provided for such a purpose is a guide plate 18 that is connected in a rotationally fixed manner to the switching toggle 17 and to which the locking block 16 is coupled in a form-locking or form-fitting manner by a pin 21 that is fitted on a strip connector 19, connected to the locking block, and engages in a guide slot 20 of the guide plate 18. A form-fitting or form-locking connection is one that connects two elements together due to the shape of the elements themselves, as opposed to a force-locking connection, which locks the elements together by force external to the elements.

FIG. 4 shows the locking block 16 in the "off" position of the switching toggle 17. In the case of a rotary movement of the switching toggle 17 and, thus, of the guide plate 18, the locking block 16 is raised upward, as a result of the profile of the guide slot 20. Such a raising operation, however, is only possible when the first lever arm 13 of the locking member 15 is not located in the adjusting path of the locking block 16. For such a purpose, the locking member 15 has to be pivoted correspondingly.

The locking member 15 is pivoted by the lug 11 of the lid 9 of the mixing bowl 3. During the corresponding pivoting movement (see arrow 26 in FIG. 5) of the mixing bowl 3, the lug 11 penetrates into the slot 12 and, in the process, comes into contact with the second lever arm 14 of the locking member 15. The locking member 15 is, thus, pivoted in the counterclockwise direction (see arrow 25 in FIG. 5). As a result, the first lever arm 13 of the locking member 15 moves from the adjusting path of the locking block 16. It is, thus, possible for the drive motor 30 to be switched on by corresponding rotation of the switching toggle 17. The switching on is possible because the condition "mixing bowl 3 closed by lid 9" has been fulfilled. During rotation of the switching toggle 17 for switching on the drive motor 30, the locking block 16 is raised and positioned behind the first lever arm 13 of the locking member 15.

The locking block 16 located behind the first lever arm 13 then, in addition, prevents the locking member 15 from pivoting back. Such a condition results in the lug 11 being blocked by the second lever arm 14 of the locking member 15 and not being able to be pivoted out of the slot 12. It is, thus, also the case, however, that the lid 9 cannot be removed from the mixing bowl 3. Because the locking block 16 is always located behind the first lever arm 13 of the locking member 15 in the "on" position of the switching toggle 17, and, thus, also in the "on" position of the switch located in the circuit of the drive motor, the lid 9 cannot be removed from the mixing bowl 3 when the drive motor has been switched on.

To achieve the corresponding blocking of the lid 9, the lug 11 is configured in two parts. It has a first lug part 22, which leads in the pivoting-in direction of the lug and projects to a lesser extent beyond the circumferential border of the lid 9. A second lug part 23, in contrast, projects radially outward to the extent where, when the lug 11 is pivoted into the slot 12, the lug 11 comes into contact with the second lever arm 14 of the locking member 15 and, thus, when the lug 11 is pivoted in, pivots the locking member 15 in the counterclockwise direction. The pivoting movement of the locking member 15 leads to the second lever arm 14 being moved closer to the circumferential border of the lid 9, with the result that it ends up located, by way of its free end, behind the first lug part 22, which projects to a lesser extent. The lid 9 is, thus, prevented from pivoting back as long as the locking member 15 is blocked by the locking block 16. As has already been described above, this is the case whenever the switching toggle 17 is located in the "on" position.

In the case of the food processor described, the corresponding locking mechanisms ensure that, on one hand, the drive motor 30 cannot be switched on when the mixing bowl 3 is not closed by the lid 9 and, on the other hand, the lid 9 cannot be removed from the mixing bowl 3 as long as the switching toggle 17 and, thus, the switch coupled to it are located in the "on" position. Such a configuration also prevents operation of the food processor from being possible without the lid 9 closed in position on the mixing bowl 3, for example, even in the case of the food processor being activated or deactivated by virtue of the power plug being pulled out or plugged in, with switch actuation being bypassed.

We claim:

1. A kitchen appliance, comprising:
   an electromotive drive having a circuit with a switch;
   a container having a lid for closing said container, said lid having an adjusting mechanism;
   an attachment selectively coupled to said drive when disposed in said container;
   a housing for receiving said container;
   a switchable actuating element disposed on said housing, said actuating element connected to said switch;
   a locking block connected to and adjusted by a switching movement of said actuating element;
   a locking block having an adjusting path, said locking block and said actuating element being two separate components mechanically coupled to one another to adjust said locking block by a switching movement of said actuating element; and
   a locking member selectively moving into and out of said adjusting path, said locking member having a locking position and a bias device imparting a locking force automatically adjusting said locking member into said locking position, said adjusting mechanism selectively moving said locking member out of said locking position.

2. The kitchen appliance according to claim 1, wherein:
   said housing has a vertically running housing part with a slot;
   said adjusting mechanism on said lid is a radially outwardly projecting lug pivoted by a corresponding rotary movement of said container into said slot, said lug having a pivoting path; and
   said locking member is a pivoting locking member having first and second lever arms, said first lever arm disposed in said adjusting path of said locking block, and said second lever arm projecting, in a region of said slot, into said pivoting path of said lug.

3. The kitchen appliance according to claim 1, wherein said bias device is a spring and said locking force is a spring force.

4. The kitchen appliance according to claim 1, wherein:
   said actuating element is a rotatable switching toggle;
   a guide plate defines a guide track;
   said guide plate is coupled to said actuating element; and
   said locking block butts against said guide track.

5. The kitchen appliance according to claim 1, wherein:
   said actuating element is a rotatable switching toggle;
   a guide plate defines a guide track;
   said guide plate is rotatably coupled to said actuating element; and
   said locking block butts against said guide track.

6. The kitchen appliance according to claim 1, wherein:
   said actuating element is a rotatable switching toggle;
   a guide plate defines a guide track;
   said guide plate is coupled to said actuating element; and
   said locking block forceably butts against said guide track.

7. The kitchen appliance according to claim 4, wherein said locking block has a pin engaging in said guide track.

8. The kitchen appliance according to claim 4, wherein:
   said switching toggle has an on position;
   said locking member is a pivoting locking member pivoting in a pivot direction; and
   in said on position of said switching toggle, said locking block engages upstream of said first lever arm in said pivot direction and blocks a pivoting movement of said locking member in a direction opposite said pivot direction.

9. The kitchen appliance according to claim 4, wherein:
   said switching toggle has an on position;
   said locking member is a pivoting locking member pivoting at least in a pivot direction; and in said on position of said switching toggle, said locking block engages said first lever arm and prevents movement of said locking member in a direction opposite said pivot direction.

10. The kitchen appliance according to claim 1, wherein:
the appliance is a food processor;
said container is a mixing bowl;
said lid is removably attached to said mixing bowl;
said housing has a vertically running housing part with a slot;
said adjusting mechanism on said lid is a radially outwardly projecting lug pivoted by a corresponding rotary movement of said mixing bowl into said slot, said lug having a pivoting path; and
said locking member is a pivoting locking member having first and second lever arms, said first lever arm disposed in said adjusting path of said locking block, and said second lever arm projecting, in a region of said slot, into said pivoting path of said lug.

11. The food processor according to claim 10, wherein:
said actuating element is a rotatable switching toggle;
a guide plate defines a guide track;
said guide plate is rotatably coupled to said actuating element; and
said locking block forceably butts against said guide track.

12. The food processor according to claim 10, wherein said locking block has a pin engaging in said guide track.

13. The food processor according to claim 10, wherein:
said switching toggle has an on position;
said locking member is a pivoting locking member pivoting in a pivot direction; and
in said on position of said switching toggle, said locking block engages upstream of said first lever arm in said pivot direction and blocks a pivoting movement of said locking member in a direction opposite said pivot direction.

14. The kitchen appliance according to claim 10, wherein:
said switching toggle has an on position;
said locking member is a pivoting locking member pivoting at least in a pivot direction; and
in said on position of said switching toggle, said locking block engages said first lever arm and prevents movement of said locking member in a direction opposite said pivot direction.

15. In a kitchen appliance having an electromotive drive with a switch, a container, an attachment selectively coupled to the drive when disposed in the container, and a housing for receiving the container, a control device comprising:
a lid for closing the container, said lid having an adjusting mechanism;
a switchable actuating element disposed on the housing, said actuating element to be connected to the switch;
a locking block connected to and adjusted by a switching movement of said actuating element;
a locking block having an adjusting path, said locking block and said actuating element being two separate components mechanically coupled to one another to adjust said locking block by a switching movement of said actuating element; and
a locking member selectively moving into and out of said adjusting path, said locking member having a locking position and a bias device imparting a locking force automatically adjusting said locking member into said locking position, said adjusting mechanism selectively moving said locking member out of said locking position.

16. A food processor, comprising:
an electromotive drive having a circuit with a switch;
a container having a lid for closing said container, said lid having an adjusting mechanism;
an attachment selectively coupled to said drive when disposed in said container;
a housing for receiving said container;
a switchable actuating element disposed on said housing, said actuating element connected to said switch;
a locking block connected to and adjusted by a switching movement of said actuating element;
a locking block having an adjusting path, said locking block and said actuating element being two separate components mechanically coupled to one another to adjust said locking block by a switching movement of said actuating element; and
a locking member selectively moving into and out of said adjusting path, said locking member having a locking position and a bias device imparting a locking force automatically adjusting said locking member into said locking position, said adjusting mechanism selectively moving said locking member out of said locking position.

17. A juice extractor, comprising:
an electromotive drive having a circuit with a switch;
a container having a lid for closing said container, said lid having an adjusting mechanism;
an attachment selectively coupled to said drive when disposed in said container;
a housing for receiving said container;
a switchable actuating element disposed on said housing, said actuating element connected to said switch;
a locking block connected to and adjusted by a switching movement of said actuating element;
a locking block having an adjusting path, said locking block and said actuating element being two separate components mechanically coupled to one another to adjust said locking block by a switching movement of said actuating element; and
a locking member selectively moving into and out of said adjusting path, said locking member having a locking position and a bias device imparting a locking force automatically adjusting said locking member into said locking position, said adjusting mechanism selectively moving said locking member out of said locking position.

18. A kitchen appliance, comprising:
a drive having a control switch;
a container for receiving a removable attachment connected to said drive when disposed in said container, said container having a lid for closing said container, said lid having an adjusting mechanism;
a housing for receiving said container;
a switchable actuating element disposed on said housing, said actuating element connected to said control switch;
a locking block having an adjusting path, said locking block connected to and adjusted by a switching movement of said actuating element, said locking block and said actuating element being two separate components; and
a locking member selectively moving into and out of said adjusting path, said locking member having a locking position and a bias device imparting a locking force automatically adjusting said locking member into said locking position, said adjusting mechanism selectively moving said locking member out of said locking position when said lid is placed to close the container.

19. In a kitchen appliance having a drive with a control switch, a container for receiving a removable attachment connected to the drive when disposed in the container, and a housing for receiving the container, a control device comprising:

a lid for closing the container, said lid having an adjusting mechanism;

a switchable actuating element disposed on said housing, said actuating element connected to the control switch of the drive;

a locking block having an adjusting path, said locking block connected to and adjusted by a switching movement of said actuating element, said locking block and said actuating element being two separate components; and a locking member selectively moving into and out of said adjusting path, said locking member having a locking position and a bias device imparting a locking force automatically adjusting said locking member into said locking position, said adjusting mechanism selectively moving said locking member out of said locking position when said lid is placed to close the container.

* * * * *